United States Patent

[11] 3,602,641

[72] Inventor Tom Heise
Emmasingel, Eindhoven, Netherlands
[21] Appl. No. 860,721
[22] Filed Sept. 24, 1969
[45] Patented Aug. 31, 1971
[73] Assignee U.S. Philips Corporation
New York, N.Y.
[32] Priority Sept. 27, 1968
[33] Netherlands
[31] 6,813,919

[54] DARK CURRENT COMPENSATION CIRCUIT
7 Claims, 2 Drawing Figs.

[52] U.S. Cl. 178/7.2 R, 178/DIG. 5, 178/DIG. 26, 178/DIG. 29
[51] Int. Cl. H04n 5/32
[50] Field of Search 178/DIG. 5, DIG. 26, DIG. 29

[56] References Cited
UNITED STATES PATENTS
3,280,253 10/1966 McMaster et al. 178/DIG. 5
FOREIGN PATENTS
1,045,854 10/1966 Great Britain

*Primary Examiner*—Robert L. Griffin
*Assistant Examiner*—George G. Stellar
*Attorney*—Frank R. Trifari

ABSTRACT: A dark current compensation circuit for a television camera features a switch for controlling an X-ray tube located in front of the camera, a video amplifier is coupled to the camera and a peak rectifier circuit is in turn coupled to the amplifier output. A switch synchronized with the first switch connects the rectifier to a capacitor to establish a dark current bias voltage which is applied to the amplifier.

PATENTED AUG 31 1971 3,602,641

Figures 1, 2:
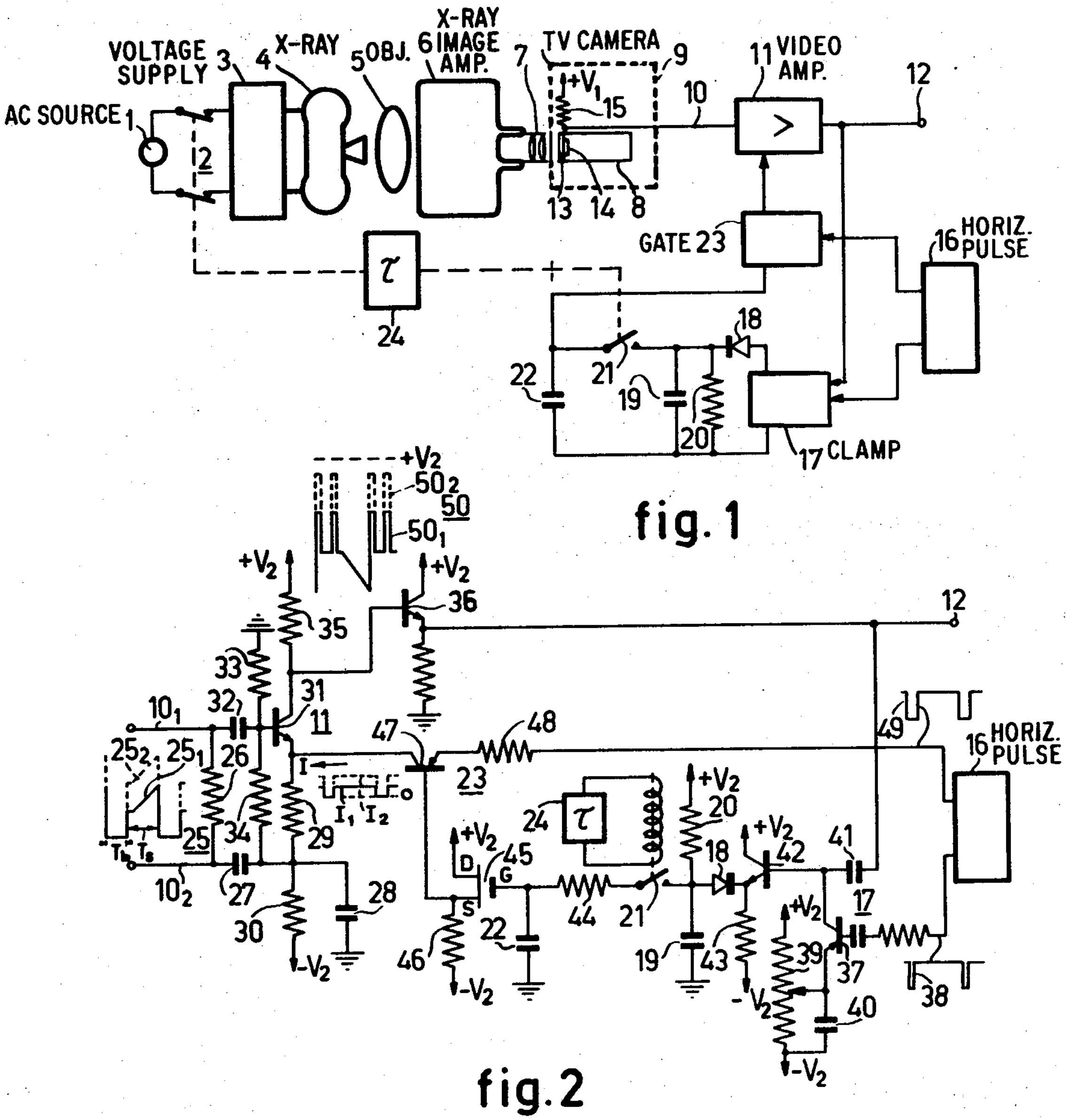

INVENTOR.

TOM HEISE

BY

AGENT

DARK CURRENT COMPENSATION CIRCUIT

The invention relates to a device for a television camera tube of the photosemiconductive type, wherein a given black level upon a varying dark current in the camera tube is fixed in a picture signal which is line-and field-generated by the camera tube, which picture signal has a scanning and a blanking period for each line and field period, an output of a picture signal amplifier circuit being connected through a peak rectifier circuit to an input thereof so as to obtain a varying bias voltage for said amplifier circuit.

In a camera tube of the photosemiconductive type a scene to be recorded is projected on a transparent, conducting signal plate connected through a resistor to a direct voltage source, which signal plate is provided with a photosemiconductive layer. A potential image corresponding to the scene is produced on the free surface of the photosemiconductive layer and is converted into a picture signal line by line and field by field as a voltage drop across the said resistor under the influence of an electron beam scanning the layer and neutralizing the potential image. The picture signal must be produced between a value corresponding to black in the scene, or the black level and a value corresponding to peak white. For a black spot occurring in the scene which spot must correspond to the black level in the picture signal a minimum current or the dark current flows in the said resistor, which current is determined by the leakage current occurring in the semiconductive layer. It is found that the leakage current in the photosemiconductive layer and hence the dark current in the said resistor is generally considerable and has a great temperature dependence in television camera tubes of the vidicon type. The result is that the black level in the picture signal produced by such camera tubes must be set in a variable manner to eliminate the influence of the dark current variations of the camera tube due to ambient temperature and voltage variations of the said direct voltage source on the black level in the picture signal which is available for further handling.

To carry out the control as described above a device for a television camera tube of the vidicon type is known from British Patent Specification 1,045,854. The camera tube applies the produced picture signal for further handling to a picture signal amplifier circuit formed as an AC amplifier. The output signal therefrom is applied during each line-scanning period to a peak rectifier circuit which measures a black level occurring during the line-scanning period. During a successive line-blanking period the measured black level provides a threshold in the peak rectifier circuit with respect to which the zero value of the picture signal associated with a blanked electron beam in the vidicon is measured during the line-blanking period. The discrepancy thus obtained is a measure of the dark current of the vidicon and is applied as a variable bias voltage to the input of the amplifier circuit during the line-blanking period to compensate for the influence of dark current variations on the black level.

As already stated in the relevant Patent Specification a drawback of the device described is that the darkest picture element of the scanned line in the camera tube is measured as the black level during each line-scanning period and determines the operation of the device. Since in many scenes the darkest picture element which, for example, has a grey hue does not correspond to the black level, it has been proposed to provide an opaque strip on the transparent screen of the camera tube, so that the black level in the picture signal produced definitely occurs during each line-scanning period. In this connection the difficulty has been pointed out that the opaque strip must be placed in such a manner that the strip is absolutely not reproduced when reproducing the recorded scene on the display screen of a television receiver.

Another drawback of providing an opaque strip is that the black level cannot be measured sufficiently accurately due to influence of scattered light and the shunt conductance in the photosemiconductive layer.

It is an object of the present invention to eliminate the said drawbacks and to provide a device which operates satisfactorily particularly when making discontinuous use of a continuously operating television camera tube of the photosemiconductive type. To this end the device according to the invention is characterized in that the peak rectifier circuit is coupled to a storage element through a switch closing after a switching signal, having a time delay of at least two field periods, which switch is open when the picture signal comprises video information during the scanning periods and is closed when video information is absent from the picture signal, the storage element for providing a bias voltage dependent on the dark current being coupled to the input of the picture signal amplifier circuit.

In order that the invention may be readily carried into effect, an embodiment thereof will now be described in detail, by way of example, with reference to the accompanying diagrammatic drawing in which:

FIG. 1 shows an X-ray television circuit employing a device according to the invention, and FIG. 2 shows an embodiment of a device according to the invention.

In FIG. 1 the reference numeral 1 shows a supply source which is, for example, an AC voltage supply mains. Supply source 1 can be connected through a bipolar switch 2 to a supply unit 3 which can apply an alternating voltage, for example, for filament current purposes and a high direct voltage obtained by transformation and rectification to an X-ray tube 4. When switch 2 is closed, X-ray tube 4 can emit X-ray radiation, which is incident on an X-ray image amplifier 6 after passing through an object 5 such as, for example, a part of the body of a person to be X-rayed. X-ray image amplifier 6 converts the amplified X-ray radiation into light which is projected through a tandem system of lenses 7 onto a television camera tube 8 in a camera 9. Camera 9 applies a picture signal produced by camera tube 8 and amplified in a manner not shown to a cable 10 which leads to a picture signal amplifier circuit 11. Amplifier circuit 11 applies the picture signal for further handling to a terminal 12. During further handling the picture signal can be converted into a video signal which is applied, for example, to a monitor or into a television signal which is transmitted by a transmitter for the display of the object 5 on a television receiver.

An X-ray television circuit is denoted by the reference numerals 2 to 9 inclusive in FIG. 1. As will be apparent from the following, it would alternatively be possible to describe an infrared television circuit or a different kind of television circuit in which the light from a scene is projected in a discontinuous manner onto a continuously operating camera tube 8.

Only a few components of television camera tube 8 are shown diagrammatically, such as a transparent, conductive signal plate 13 which is provided with a photosemiconductive layer 14. Signal plate 13 is connected through a resistor 15 to a terminal conveying a more or less constant variable potential +V. Layer 14 is scanned line by line and field by field by an electron beam not shown so that a potential image present thereon and corresponding to the scene is neutralized. The resultant instantaneous voltage drop across resistor 15 determines the picture signal applied to the cable 10. The picture signal comprises two components one of which must supply the video information between black level and peak white and the other must supply the dark current flowing through resistor 15 and corresponding to the unwanted leakage current in the semiconductive layer 14. For illustration there applies that the dark current may have approximately the same value as the current difference between black level and peak white at an ambient temperature of the camera tube of approximately +20° C. For an ambient temperature of approximately +40° C. the dark current may be many times larger, for example, 5 times larger than the current difference between black level and peak white, which difference has remained the same in case of an unchanged potential +V.

To compensate for the influence of dark current variations caused by ambient temperature variations and variations in the constancy and the adjustment of the potential +V, the X-ray television circuit according to FIG. 1 is provided with a device according to the invention. In the device the picture signal amplifier circuit 11 formed as an AC amplifier applies the picture signal and a pulse source 16 applies pulses occurring during each line-blanking period to a clamping circuit 17 incorporated in a peak rectifier circuit for introducing a direct voltage component into the picture signal. The peak rectifier circuit is furthermore provided with a unidirectional current-conducting element formed as a diode 18, a charge capacitor 19 and a leakage resistor 20. Capacitor 19 may be connected through a switch 21 to a capacitor 22 employed as a storage element. The terminal of capacitor 22 connected to the switch 21 is connected through a gating circuit 23, to which switching pulses of line frequency are applied by the pulse source 16, to the picture signal amplifier circuit 11 for supplying a bias voltage. As is shown by a broken line, the switches 2 and 21 are coupled in a mechanical or electromechanical manner through a time delaying element 24 with a time delay $\tau$. Initially switch 2 is open and switch 21 is closed, when switch 2 is closed switch 21 is opened at the same time, while subsequent opening of switch 2 causes the switch 21 to be again closed only after a time delay.

The operation of the X-ray television circuit according to the invention is as follows: initially when switch 2 is open, during which switch 21 is closed, the X-ray tube 4 is switched off, so that no light is projected onto the screen of the television camera tube 8. The result is that the picture signal produced by the camera tube does not comprise video information, but only represents the dark current. Starting from a positively directed picture signal supplied by circuit 11 at which the dark current during the line-scanning period is positive relative to the value of the picture signal during the line-blanking period, the capacitors 19 and 22 will convey a voltage which corresponds to the peak value of the dark current. Capacitor 22 applies through the gating circuit 23 a proportional bias voltage to the picture signal amplifier circuit 11. If the value of the dark current changes, for example, due to a variation of the ambient temperature of the camera tube 8, the bias voltage applied to the circuit 11 will also change through the peak rectifier circuit (17–20), switch 21, capacitor 22 and gating circuit 23 in such a manner that the level corresponding to the dark current in the picture signal provided by the picture signal amplifier circuit 11 does not change. Since the dark current component and the black level must coincide in a picture signal which comprises both a video and a dark current component the result would be that the black level would be set when video information is present.

The closing of switch 2 and the concurrent opening of switch 21 results in the X-ray tube 4 being activated. The object 5 is consequently displayed on the screen of the camera tube 8, so that the picture signal produced by the tube 8 comprises video information. The picture signal amplifier circuit 11 applies the picture signal comprising a positively directed video component to the peak rectifier circuit (17–20) so that capacitor 19 is charged to the maximum value of the picture signal. Since the switch 21 is open, the voltage across capacitor 19 cannot influence the constant voltage across capacitor 22, so that the bias voltage across the amplifier circuit 11 and corresponding to the dark current does not change. The X-ray examination of the object 5 which may be, for example, a part of a body of a person must be performed as quickly as possible so as to prevent injury thereof, so that after closing switch 2, it is reopened after a short time.

Opening switch 2 manually or automatically renders the X-ray tube 4 inoperative. Since the line and field scanning in the camera tube 8 continues the potential image on the photosemiconductive layer 14 will be neutralized after two fields such that the video component no longer occurs in the picture signal produced by the camera tube 8. Subsequently the charge across capacitor 19 which is determined by the maximum value of the picture signal including the video component will leak away through resistor 20. Dependent on the RC-time constant, capacitor 19 will again obtain the charge after a short time which corresponds to the dark current. At that instant which may be after a duration $\tau$ after switching off switch 2, switch 21 can be closed. If the dark current has changed during the period of X-ray examination the voltage across capacitor 22 will become equal to the changed voltage across capacitor 19. The result is that the bias voltage applied to the amplifier circuit 11 is adapted to the changed dark current.

The capacitance of capacitor 22 must be small relative to that of capacitor 19, so that in case of a higher voltage across capacitor 19 this capacitor is not too heavily loaded by the capacitor 22, while in case of a smaller voltage across capacitor 19 it must be possible for capacitor 22 to follow it quickly. In an embodiment of the device a ratio of 1 to 10 is found to be satisfactory.

It appears in practice that the time delay $\tau$ for an X-ray television circuit must be several seconds. This is caused by the fact that after switching off switch 2, the X-ray radiation does not immediately drop out under the influence of the high voltage which is still applied for some time by the supply unit 3 to the X-ray tube 4. For measuring the dark current in a very accurate manner, a time delay $\tau$ of approximately 20 seconds was found to be sufficient. Even in a plurality of examinations successively performed at waiting periods shorter than 20 seconds, the dark current variation was found to vary so slowly that a satisfactory stabilization of the black level in the picture signal supplied by the picture signal amplifier circuit 11 was still ensured.

FIG. 2 shows a detailed embodiment of a device according to the invention. The device may be used, for example, in X-ray infrared television circuits and similar circuits.

Components already having reference numerals in FIG. 1 are denoted by the same reference numerals in FIG. 2, although in case of an unchanged function the manner of connection in the device of FIG. 2 may be modified.

The cable 10 of FIG. 1 is divided into two lines $\mathbf{10_1}$ and $\mathbf{10_2}$ in FIG. 2 which apply a picture signal 25 produced by camera tube 8 and amplified in the camera 9 to the picture signal amplifier circuit 11. The picture signal 25 is shown by picture signals $\mathbf{25_1}$ and $\mathbf{25_2}$ shown by solid and broken lines, respectively the significance of which will be apparent from the following. The positively directed picture signal 25 is shown for one and a half line periods, the line-blanking period being denoted by $T_b$ and the line-scanning period being denoted by $T_s$. Starting from a relationship which is common for X-ray television the line-blanking period $T_b$ is slightly shorter and the line-scanning period $T_s$ is slightly longer than half a line period. The picture signal $\mathbf{25_1}$ shown by solid lines may be produced in a camera tube 8 of the vidicon type the ambient temperature of which is approximately 20° C. As a result a picture signal $\mathbf{25_1}$ is shown the video and dark current components of which are equally large during the line-scanning period $T_s$. The video component is shown by an obliquely directed line which is considered to vary from the black level in the middle of one line period to peak white at the end thereof. The difference between the black level shown and the level shown in the line-blanking period $T_b$ indicates the value of the dark current. For, example, a higher ambient temperature of the camera tube 8 the dark current will increase which is indicated in the picture signal $\mathbf{25_2}$ shown by broken lines for a dark current which is twice as large.

The lines $\mathbf{10_1}$ and $\mathbf{10_2}$ of cable 10 are connected together through a resistor 26 which is characteristic for the cable. The line $\mathbf{10_2}$ is connected through an isolation capacitor 27 to a terminal of a capacitor 28 the other terminal of which is connected to ground, and to one end of resistor 29 and 30, the other ends of which are connected to an emitter electrode of a transistor 31 and to a terminal conveying a constant voltage $-V_2$, respectively The terminal conveying the voltage $-V_2$ forms part of a supply source $V_2$ not shown, whose terminals conveying the voltages $+V_2$ and $-V_2$ will hereinafter be referred to as terminals $+V_2$ and $-V_2$. The line $10_1$ is connected through an isolation capacitor 32 to the base electrode of the transistor 31. The base electrode of transistor 31 is connected through a resistor 33 and a resistor 34 to earth and to the capacitor 28, respectively. The collector electrode of the transistor 31 is connected through a resistor 35 to the terminal $+V_2$ and is connected to a base electrode of a transistor 36 arranged as an emitter follower. The emitter electrode of transistor 36 is connected to the terminal 12. Transistors 31 and 36 are the active components which form part of the picture signal amplifier circuit 11.

Since the mean values in the picture signals $25_1$ and $25_2$ are unequal the result without taking further steps would be that the picture signal amplifier circuit 11 formed as an AC amplifier would supply voltages by which, when being applied to a clamping circuit active during the line-blanking period $T_b$, the black level in only one of the two voltages would be determined, as the levels have a different value in both signals.

In the device of FIG. 2 according to the invention clamping circuit 17 is formed with a transistor 37 to the base electrode of which pulses 38 occurring during the line-blanking period $T_b$ and supplied by the pulse source 16 are applied, while the emitter electrode is connected to a tapping or a potentiometer 39 which is connected between the terminals $-V_2$ and $+V_2$. The tapping on potentiometers 39 is connected through a capacitor 40 to the terminal $-V_2$. The collector electrode of transistor 37 is connected through a capacitor 41 to terminal 12 and is also connected to a base electrode of a transistor 42 which is connected as an emitter follower through a resistor 43 to the terminal $-V_2$. The emitter electrode of transistor 42 is connected to the cathode of the diode 18, whose anode is connected both to a terminal of the capacitor 19, whose other terminal is connected to earth, and through the leakage resistor 20 to the terminal $+V_2$. The voltage conveying terminal of capacitor 19 may be connected to a terminal of capacitor 22 with the aid of switch 21 and the time-delaying element 24 through a smoothing resistor 44. The other terminal of capacitor 22 is connected to earth. The voltage conveying terminal of capacitor 22 is connected to a control electrode G of a field effect transistor 45 which is active as a voltage-controlled unidirectional current-conducting element. An electrode D of the field effect transistor 45 is connected to the terminal $+V_2$ and an electrode S is connected through a resistor 46 to the terminal $-V_2$. The electrode S serves as an output electrode and is connected to a base electrode of a transistor 47. The emitter electrode of transistor 47 is connected through a resistor 48 to the pulse source 16 which supplies pulses 49 during the line-blanking period $T_b$. The collector electrode of the transistor 47 active in the gating circuit 23 is connected to the emitter electrode of the transistor 31 in the picture signal amplifier circuit 11.

To explain the operation of the device according to the invention, the starting point is a device in which switch 21 is open and capacitor 22 has obtained a voltage at a previous closure of switch 21, which voltage is associated with the dark current component in the picture signal $25_1$. The constant voltage across capacitor 22 having a value of, for example, +3V yields a constant current flowing through resistor 46 via the field effect transistor 45, so that a constant voltage of, for example, +6V is impressed on the base electrode of transistor 47. The pulses 49 which are, for example, between approximately +6.5V and 0V cutoff transistor 47 during the negatively directed pulses which have a duration of, for example, one fourth to approximately three fourths of the line-blanking period $T_b$. The transistor 47 is bottomed outside this range. The result is that a current I indicated by $I_1$ will flow in the emitter collector circuit of transistor 47 in which the resistors 48, 29 and 30 and the capacitor 28 are arranged. As a result the current $I_1$ flowing through resistor 29 will supply an additional voltage during the period of the transistor 47 being bottomed, so that the negative voltage across the capacitor 28 becomes less negative. When transistor 47 is cutoff capacitor 28 only determines the bias voltage which is impressed on the emitter electrode of transistor 31. The result is that the collector electrode of transistor 31 conveys a voltage 50 indicated by $50_1$ which is plotted relative to a level $+V_2$ for the purpose of illustration. If the control through transistor 47 would not be used, voltage $50_1$ would be uniform in phase opposition to the picture signal $25_1$ and would be so much lower with respect to the level $+V_2$ as corresponds to the height of the pulses in the voltage $50_1$.

The voltage $50_1$ is applied in a uniform manner to the cathode of the diode 18 through the transistors 36 and 42 connected as emitter followers and after the introduction of a direct voltage component with the aid of clamping circuit 17. Capacitor 19 is therefore charged to its highest value in the negatively directed voltage $50_1$, for example, peak white.

As described in FIG. 1, a video component will not any longer occur in the picture signal $25_1$ and hence voltage $50_1$ after opening switch 2 and a delay time $\tau$ of the time-delaying element 24 so that a sufficiently discharged capacitor 19 will convey a voltage (+3V) which corresponds to the dark current component. Apart from leakage losses for capacitor 22, the voltages across the capacitors 19 and 22 will be equal for a dark current component which is unchanged relative to the previous measurement so that no charge transport takes place when switch 21 closes.

A similar explanation as the one described above applies to the picture signal $25_2$. Due to the larger dark current component the voltage across capacitor 19 will be less positive, for example, +2V when the video component is absent which voltage is impressed through switch 21 upon capacitor 22. The voltage impressed on the base electrode of transistor 47 will therefore likewise be less positive, for example, +5V, so that a current $I_2$ flows which is larger than $I_1$ due to the constant amplitude of the pulses 49. The result is that the collector electrode of the transistor 31 conveys a voltage $50_2$ under the influence of the larger voltage drop across resistor 29 caused by the current $I_2$. An additional direct voltage component is introduced by a larger current $I_2$ with the aid of transistor 47, which component relative to the current $I_1$ corresponds to the height of the pulses in the voltage $50_2$ shown by broken lines.

For illustration the level $+V_2$ is shown for the voltages $50_1$ and $50_2$. It is evident that the level $+V_2$ should be much higher for a dark current component which may be, for example, 5 times higher than that in the picture signal $25_1$.

To be able to measure small dark current variations, the amplification which can be obtained with the aid of the picture signal amplifier circuit 11 must be as large as possible.

It will be evident that for obtaining the smallest possible losses in the device, it is required that transistor 47 is not bottomed when the smallest possible dark current component occurs in the picture signal 25. Transistor 47 would have to convey its maximum current at the greatest dark current to be expected. For illustration there applies that the voltage impressed on the base electrode of transistor 47 may vary from +6V to 0V for a pulse value of, for example, between +6V and 0V of the pulses 49, the voltages across capacitors 19 and 22 varying, for example, from +3V to −3V in case of a change from the smallest to the largest dark current.

A few values of components important for an embodiment of the device follows for the purpose of illustration.

$C_{19}$=10 μF.
$C_{22}$=1 μF.
R20=100 k.Ohm.
R44=100 k.Ohm.
R29=270 Ohm.
R48=270 Ohm.

What is claimed is:

1. A circuit for eliminating dark current effects of a television camera tube, comprising circuit means for alternately causing video signals and dark current signals to be provided by said tube; a video amplifier having a signal input coupled to said tube, a bias input, and an output; a peak rectifier circuit coupled to said amplifier output; a storage circuit coupled to said bias input; a first switch coupled intermediate said rectifier circuit and said storage circuit; said first switch being controlled by said circuit means to connect said rectifier circuit to said storage circuit only during the occurrence of said dark current signal and to disconnect said rectifier circuit from said storage circuit during the occurrence of said video signals, said circuit means comprising time-delay means to reconnect the rectifier and storage circuits through said first switch only after a time delay of at least one frame period from the cessation of said video signals.

2. A circuit as claimed in claim 1 wherein said storage circuit comprises a controlled element having an output electrode coupled to said amplifier and a control electrode; and a first capacitor coupled to said control electrode.

3. A circuit as claimed in claim 2 wherein said peak rectifier circuit comprises a second capacitor having a capacitance substantially equal to 10 times the capacitance of said first capacitor.

4. A circuit as claimed in claim 1 further comprising means for generating line-blanking pulses; a gate comprising a controlled element having an input electrode coupled to said generating means, and an output electrode coupled to said amplifier bias input, and a control electrode coupled to said storage circuit.

5. A circuit as claimed in claim 1 wherein said circuit means further comprises an X-ray tube disposed to irradiate said television camera tube, and a second switch coupled to said X-ray tube.

6. A circuit as claimed in claim 1 wherein said time delay comprises at least two field periods.

7. A circuit as claimed in claim 1 wherein said tube comprises a photosemiconductive tube.